United States Patent [19]
Olmstead

[11] 3,942,378
[45] Mar. 9, 1976

[54] FLUID FLOW MEASURING SYSTEM

[75] Inventor: John Aaron Olmstead, Somerville, N.J.

[73] Assignee: RCA Corporation, New York, N.Y.

[22] Filed: June 28, 1974

[21] Appl. No.: 484,093

[52] U.S. Cl. ............................................... 73/204
[51] Int. Cl.² .......................................... G01F 1/68
[58] Field of Search ................................... 73/204

[56] References Cited
UNITED STATES PATENTS

| | | | |
|---|---|---|---|
| 2,947,938 | 8/1960 | Bennett | 73/204 X |
| 3,176,514 | 4/1965 | Foster | 73/233 |
| 3,263,484 | 8/1966 | Watson et al. | 73/15 |
| 3,363,462 | 1/1968 | Sabin | 73/204 |
| 3,429,178 | 2/1969 | Durbin | 73/204 |
| 3,433,068 | 3/1969 | Werner | 73/204 |
| 3,680,377 | 8/1972 | Lightner | 73/204 |
| 3,683,692 | 8/1972 | Lafitte | 73/204 |
| 3,729,995 | 5/1973 | Kovacs et al. | 73/204 |

*Primary Examiner*—Herbert Goldstein
*Attorney, Agent, or Firm*—H. Christoffersen; R. P. Williams; T. H. Magee

[57] ABSTRACT

A fluid flow measuring system utilizing semiconductor devices as heating and temperature sensitive elements produces an electrical output signal which is linearly proportional to the rate of flow of a fluid and which automatically compensates for changes in fluid density.

8 Claims, 1 Drawing Figure

U.S. Patent   March 9, 1976   3,942,378
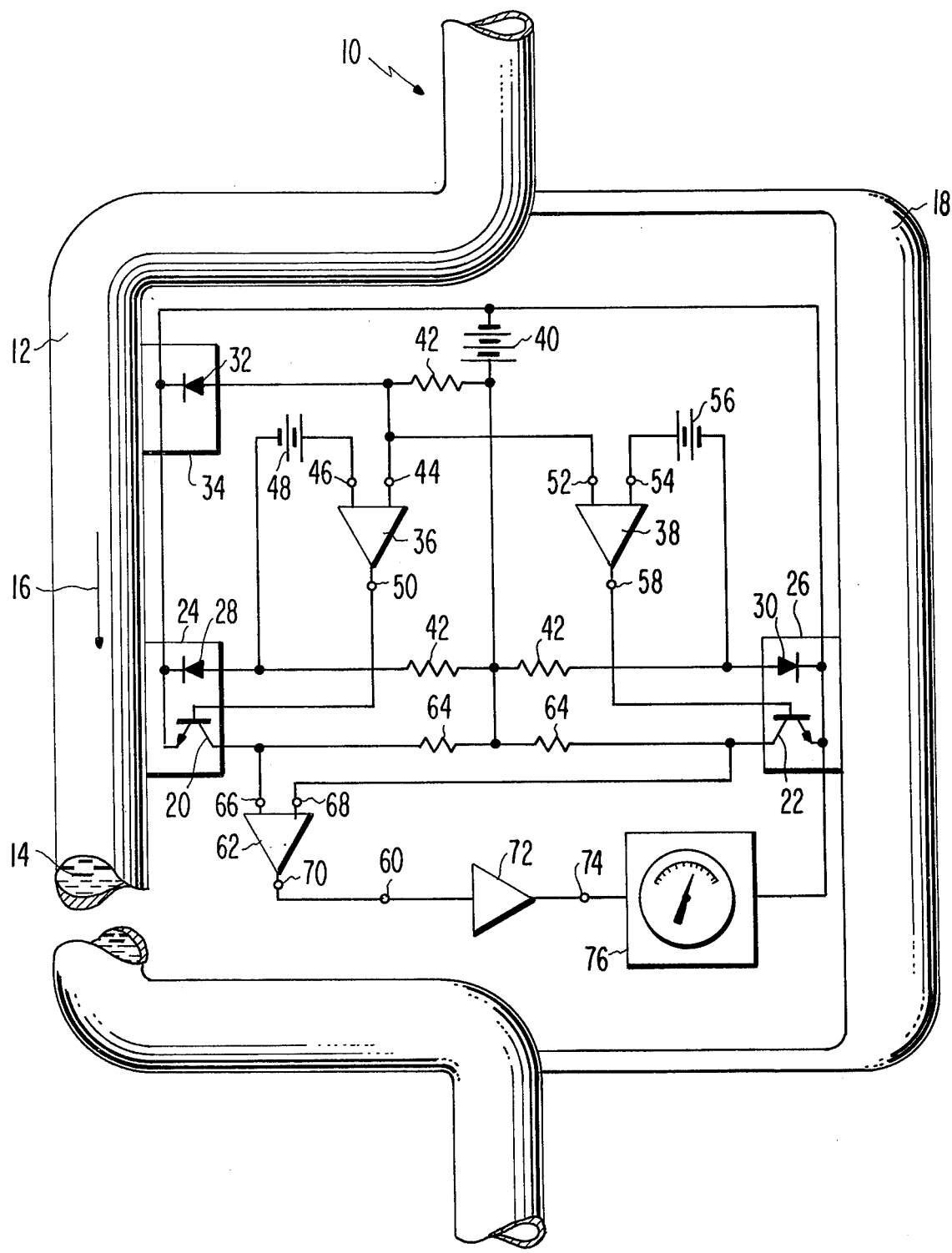

FLUID FLOW MEASURING SYSTEM

This invention relates to a fluid flow measuring system utilizing semiconductor heating elements and semiconductor temperature sensitive elements. The system produces an electrical output signal which is linearly proportional to the rate of flow of a fluid and automatically compensates for changes in fluid density without need for external pressure and temperature sensors.

Fluid flow measuring systems comprising thermistors or electrical resistance heating wires used as bridge elements are known in the prior art. The basic principles upon which such systems depend for their operation as rate of fluid flow indicators are the cooling effect of a flowing fluid upon the thermistor or hot wire elements, which are thermally coupled to the fluid, and the resultant change in electrical resistance of the elements with change in temperature. In these fluid flow measuring systems, it is known to make use of two such elements in a balanced bridge circuit, one element being thermally coupled to the flowing fluid and the other element being thermally coupled to a substantially stationary fluid, but both elements being exposed to the same ambient or "background" conditions so that the circuit is not sensitive to changes in conditions which are common to both temperature-sensitive elements. An unbalance measuring meter, centrally connected between the two sides of the bridge, then indicates the magnitude of any unbalance therein which reflects the measure of fluid flow producing a cooling influence on the element exposed directly to the flowing fluid.

In such measuring systems, the electrical output signal of the measuring meter has not been linearly proportional to the rate of fluid flow. Other types of fluid flow systems, including those where the flow rate of the fluid is indicated by the electrical power supplied to a heating element exposed directly to the flowing fluid, have also not provided a linear output signal. Consequently, such measuring systems have been difficult to calibrate, especially those systems which do not automatically compensate for changes in fluid density, and the task of incorporating the output signals of such non-linear calibrated systems into other related measuring systems, such as automotive miles-per-gallon indicator systems, is relatively complex and has required extensive circuitry.

IN THE DRAWING

The FIGURE is a circuit diagram illustrating the present fluid flow measuring system together with a partial diagrammatic plan view of a fluid flow conduit showing schematically where electrical elements of the system are thermally coupled to a fluid in the conduit.

Referring to the FIGURE, there is shown a conduit 10 which has a first region 12 therein containing a flowing fluid 14, the direction of flow of which is shown by the flow arrow 16, and a second region 18 therein containing fluid 14 which is substantially stationary. Preferably, the first and second regions 12 and 18 comprise separate first and second flow channels with the cross-sectional area of the portions of the second region 18 which connect the second region 18 to the first region 12 being small in order to restrict the flow of fluid 14 through the second region 18 to a level where the fluid 14 therein is substantially stationary.

The FIGURE also shows a circuit diagram illustrating a preferred embodiment of the present fluid flow measuring system which has electrical elements thermally coupled to the fluid 14. First and second heating elements which in the preferred embodiment are semiconductor heating transistors, 20 and 22, are thermally coupled to the fluid 14 in the first and second regions 12 and 18 respectively. Preferably, the first and second heating transistors 20 and 22 are components of first and second semiconductor chips 24 and 26 respectively which also comprise first and second temperature sensitive elements respectively. The first and second temperature sensitive elements are shown in the present embodiment as temperature sensitive diodes 28 and 30 which are thermally coupled to the first and second heating transistors 20 and 22 respectively. In addition, a third temperature sensitive element, shown as part of a third semiconductor chip 34, comprising, for example, a temperature sensitive diode 32, is thermally coupled to the fluid 14 and is positioned on the conduit 10 to measure the ambient temperature of the fluid 14 entering the conduit 10. The first, second and third temperature sensitive elements in combination with additional circuit means comprise means for maintaining the temperature of both the first and second heating elements at a constant number of degrees higher than the ambient temperature of the fluid 14. In the FIGURE, the third chip 34 is positioned near the entrance of the first channel 12. Preferably, the first, second and third chips 24, 26 and 34 are components of a fluid flow sensor configuration such as disclosed in my co-pending application, Ser. No. 484,092, filed concurrently herewith, and the first and second chips 24 and 26 are combined into one long and thin integrated cicuit chip which has the heating transistors 20 and 22 positioned at its two ends, respectively, thermally coupled to the fluid 14 in the first and second channels 12 and 18.

In the preferred embodiment, the purpose of the temperature sensitive diodes 28, 30 and 32 is to generate comparative control voltages which are utilized to control the current to the first and second heating transistors 20 and 22 and thereby maintain the chips 24 and 26 at a constant number of degrees higher than the ambient temperature of the fluid 14, preferably about 30° C higher. When the temperature of the diodes 28, 30 and 32 increases, their anode-to-cathode voltage decreases if the diodes 28, 30 32 are supplied with a constant current. Accordingly, by comparing the voltages present across the first and second diodes 28 and 30 with the voltage present across the third diode 32, the differences in voltage can be measured and utilized as a signal to control the current to the first and second heating transistors 20 and 22 and thereby to maintain the chips 24 and 26 at a temperature about 30° C higher, in this example, than the ambient temperature of the fluid 14. This is achieved in the present embodiment by first and second differential amplifiers 36 and 38. A first potential source, shown as a first battery 40, supplies power to the first, second and third diodes 28, 30, and 32. The current to the diodes 28, 30 and 32 is maintained substantially constant by means of resistors 42 having a large resistance relative to the resistance of the diodes 28, 30 and 32 each connected in series with one of the diodes.

The first differential amplifier 36 has a first input terminal 44 connected to the anode of the third diode 32. A second input terminal 46 is connected to one side of a second potential source, shown as a second battery 48, and the other side of the battery 48 is connected to the anode of the first diode 28. An output terminal 50 of the differential amplifier 36 is connected to the base electrode of the first heating transistor 20. The second differential amplifier 38 has a first input terminal 52 connected to the anode of the third diode 32, a second input terminal 54 in series with a third potential source, shown as a third battery 56, connected to the anode of the second diode 30, and an output terminal 58 connected to the base electrode of the second heating transistor 22. The second and third batteries 48 and 56 are used to keep the voltage of the second input terminals 46 and 54 sufficiently higher than the voltage of the first input terminals 44 and 52 so as to maintain the temperature of the chips 24 and 26 about 30° C higher, in this example, than the ambient temperature of the fluid 14.

Also shown in the FIGURE are circuit means for comparing the power dissipated in the first and second heating transistors 20 and 22 which produce respectively first and second current signals proportional to the power dissipated therein, to produce a difference signal at a circuit node 60 proportional to the difference in power dissipated between the heating transistors 20 and 22, and circuit means for squaring this difference signal. In the preferred embodiment, the circuit means for comparing the power dissipated in the heating transistors 20 and 22 comprises a third differential amplifier 62 which measures the difference in the collector-to-emitter currents of the first and second heating transistors 20 and 22. The power dissipated in the heating transistors 20 and 22 is proportional to the collector-to-emitter currents drawn by the heating transistors 20 and 22 when a substantially constant voltage is applied to their collector electrodes. The collector electrodes of the heating transistors 20 and 22 are supplied with such a substantially constant voltage by the first battery 40, as shown in the FIGURE, with low current-sensing resistors 64 in series therewith.

The third differential amplifier 62 has a first input terminal 66 connected to the collector electrode of the first heating transistor 20, a second input terminal 68 connected to the collector electrode of the second heating transistor 22, and an output terminal 70 connected to a means for squaring the resulting difference signal, this means comprising a squaring amplifier 72 in the preferred embodiment. The squaring amplifier 72 squares the difference signal and produces an electrical output signal at a circuit node 74 which is linearly proportional to the rate of flow of the fluid 14. The output of the squaring amplifier 72 is connected to one side of a linearly calibrated meter 76, the other side of which is connected back to the battery 40. The meter 76 then indicates the rate of flow of the fluid 14.

The operation of the present fluid flow measuring system is based on a heat transfer expression which relates the power dissipated in the chips 24 and 26 to the temperatures of the chips 24 and 26 and, consequently, the fluid 14. This heat transfer expression, a known thermal resistance equation, is as follows:

$$T_c - T_a = \theta P \quad (1)$$

where:
 $T_c$ is the temperature of the chips 24 and 26;
 $T_a$ is the ambient temperature of the fluid 14;
 $\theta$ is the thermal resistance between the chips 24 and 26 and the fluid 14; and
 P is the power dissipated in the chips 24 and 36.

Experiments have shown that the inverse of $\theta$, i.e. the thermal conductivity between the chips 24 and 26 and the fluid 14, can be expressed as follows:

$$1/\theta = A + (BU)^n \quad (2)$$

where:
 A represents the thermal conductivity between the chips 24 and 26 and the fluid 14 under conditions where the fluid 14 is not flowing;
 B is a coupling coefficient representing the additional thermal conductivity throughout the fluid due to the presence of flow conditions;
 U is the mass rate of flow of the fluid 14; and
 n is an exponent whose value depends upon the level of turbulence of the fluid 14.

Both A and B are dependent upon the thermal conductivity of the fluid 14 and therfore dependent upon the density of the fluid 14. By substituting for $\theta$ in the thermal resistance equation (1), the following expression is obtained;

$$(T_c - T_a)(A + (BU)^n) = P \quad (3)$$

Experiments have shown that the exponent n becomes about 0.5 if the flow of the fluid 14 is laminar or only slightly turbulent. Such flow can be achieved by using a fluid flow sensor configuration whose elements do not extend into the flow channels 12 and 18, such as disclosed in my co-pending application, mentioned above.

The above information may be applied to the first and second flow channels 12 and 18 of the present fluid flow measuring system in which the flow is non-turbulent to obtain the following expressions:

$$(T_{c12} - T_a)(A + (BU_{12})^{.5}) = P_{12} \quad (4)$$

$$(T_{c18} - T_a)(A + (BU_{18})^{.5}) = P_{18} \quad (5)$$

where subscripts indicate the conditions in the first and second channels 12 and 18 respectively. If the temperature of both chips 24 and 26 is at a constant number of degrees higher than the ambient temperature of the fluid 14, the above two expressions may be substracted to obtain the following expression:

$$(C)(B)^{.5}(U_{12}^{.5} - U_{18}^{.5}) = P_{12} - P_{18} \quad (6)$$

where C is a constant representing the constant difference in temperature between the chips 24 and 26 and the fluid 14. For each specific design of the conduit 10, the rate of flows of the fluid 14 in the flow channels 12 and 18 are held in a specific proportion represented by a constant value $\gamma$ equal to $U_{18}/U_{12}$. By substituting this proportion in the above expression, the following linear expression is obtained:

$$(1-\gamma)(C)(B)^{.5}U_{12}^{.5} = P_{12} - P_{18} \quad (7)$$

Since the fluid 14 in the second flow channel 18 is substantially stationary, $U_{18}$, and therefore $\gamma$, will be close to zero. By squaring the above expression and expressing P as a product of voltage E and current I, the following expression is obtained:

$$(K)(B)U_{12} = (I_1 - I_2)^2 \quad (8)$$

where:
 $I_1$ and $I_2$ are the collector-to-emitter currents of the first and second heating transistors 20 and 22 respectively under the application of a substantially constant voltage, E, to the collectors of both transistors 20 and 22; and K is a constant which is a function of the system constants C, E, and γ.

The right side of the above expression, $(I_1-I_2)^2$, now becomes equal to the electrical output of the squaring amplifier 72 of my fluid flow measuring system. Although B, the coupling coefficient of the fluid 14 due to the presence of flow conditions, is a function of the density of the fluid 14, variations in B due to changes in the density of the fluid 14 are relatively insignificant compared to variations in A. Therefore, from a practical standpoint, B may be treated essentially as a constant, and $(I_1-I_2)^2$ is a true rate of flow signal which not only is linearly proportional to $U_1$, the rate of flow of the fluid 14, but also has automatically compensated for any change in the density of the fluid 14 since it is not dependent upon the value of A, which was eliminated in the difference equation (6).

Since the rate of flow of the fluid 14 is linearly proportional to the electrical output of the squaring amplifier 72 which has essentially compensated for any change in the density of the fluid 14, the present fluid flow measuring system can be readily calibrated, and the electrical output signal can be easily incorporated into other related systems which require information concerning the rate of flow of a fluid 14, such as miles-per-gallon indicator systems. Always maintaining the temperature of both heating transistors 20 and 22 at a constant number of degrees above the ambient temperature of the fluid 14 not only allows for convenient linearization but also provides for good sensitivity and response time regardless of large variations in the ambient temperature of the fluid 14.

What is claimed is:

1. A fluid flow measuring system for measuring the rate of flow of a fluid in a first region of a conduit adapted to contain said fluid, said conduit including a second region therein wherein said fluid is substantially stationary, comprising:

a first heating element adapted to be thermally coupled to said fluid in said first region, said first heating element producing a first current signal proportional to the power dissipated in said first heating element, a second heating element adapted to be thermally coupled to said fluid in said second region, said second heating element producing a second current signal proportional to the power dissipated in said second heating element, means electrically connected to said first and said second heating elements, including a first potential source, for supplying a substantially constant voltage to said first and said second heating elements, means including temperature sensitive elements thermally coupled respectively to said first heating element, to said second heating element, and to said flowing fluid entering said conduit thereby sensing the ambient temperature thereof, said means for controlling the current to said first and said second heating elements and thereby maintaining the temperature of both said first and said second heating elements at a constant number of degrees higher than the ambient temperature of said fluid, circuit means connected to said first and said second heating elements for comparing said first and said second current signals to produce a difference signal proportional to the difference in power dissipation between said first and said second heating elements, and circuit means connected to said comparing means for squaring said difference signal to produce an output signal, said output signal being substantially linearly proportional to the rate of flow of said fluid in said first region and being substantially compensated for changes in the density of said fluid.

2. A fluid flow measuring system as defined in claim 1 wherein said controlling and maintaining means comprises:

a first temperature sensitive element thermally coupled to said first heating element, a second temperature sensitive element thermally coupled to said second heating element, a third temperature sensitive element adapted to be thermally coupled to said flowing fluid, said third temperature sensitive element positioned to measure the ambient temperature of said flowing fluid entering said conduit, means electriically connected to said first, said second and said third temperature sensitive elements, including said first potential source, for supplying a substantially constant current to said first, said second and said third temperature sensitive elements, circuit means connected to said first and said third temperature sensitive elements and responsive thereto for maintaining the temperature of said first heing element at a constant number of degrees higher than the temperature of said third temperature sensitive element, and circuit means connected to said second and said third temperature sensitive elements and responsive thereto for maintaining the temperature of said second heating element at said constant number of degrees higher than the temperature of said third temperature sensitive element.

3. A fluid flow measuring system as defined in claim 2 wherein said first and said second regions are separate channels of said conduit.

4. A fluid flow measuring system as defined in claim 2 wherein said first and said second heating elements are semiconductor heating transistors having base, collector, and emitter electrodes, and said first, said second and said third temperature sensitive elements are temperature sensitive semiconductor diodes.

5. A fluid flow system as defined in claim 4 wherein said circuit means responsive to said first and said second temperature sensitive diodes comprises a first differential amplifier having a first input terminal thereof connected to respond to changes in potential across said third temperature sensitive diode, a second input terminal thereof placed in series with a second potential source and connected to respond to changes in potential across said first temperature sensitive diode, and an output terminal thereof connected to the base electrode of said first heating transistor, and wherein said circuit means responsive to said second and said third temperature sensitive diodes comprises a second differential amplifier having a first input terminal thereof connected to respond to changes in potential across said third temperature sensitive diode, a second input terminal thereof placed in series with a third potential source and connected to respond to changes in potential across said second temperature sensitive diode, and an output terminal thereof connected to the base electrode of said second heating transistor.

6. A fluid flow system as defined in claim 4 wherein said circuit means for comparing said first and said second current signals comprises a third differential amplifier having a first input terminal thereof connected to respond to changes in the collector-to-emitter current of said first heating transistor and a second input terminal thereof connected to respond to changes in the collector-to-emitter current of said second heating transistor.

7. A fluid flow system as defined in claim 6 wherein said circuit means for squaring said difference signal comprises a squaring amplifier.

8. A fluid flow system as defined in claim 7 wherein said constant number of degrees is about 30° C.

* * * * *